Jan. 15, 1929.　　　　　F. MEYER　　　　　1,699,305
METHOD OF MAKING GLASS VESSELS
Filed April 14, 1927　　　3 Sheets-Sheet 1
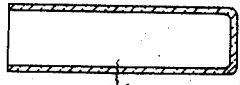
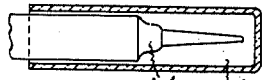
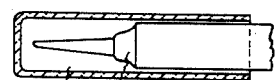
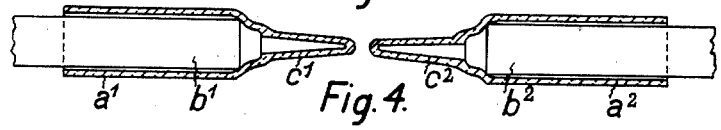
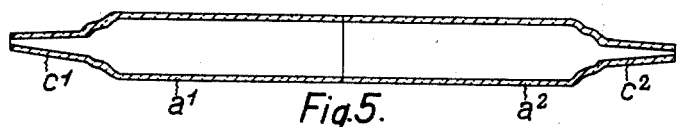
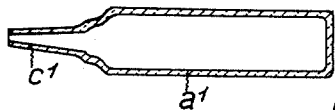
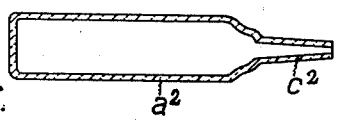
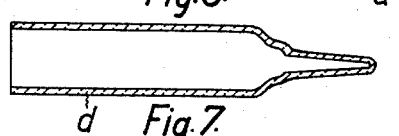
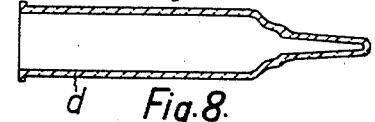
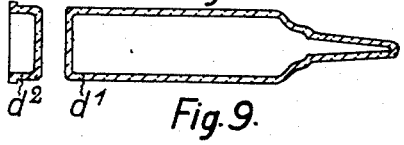

Jan. 15, 1929.　　　　　　　　　　　　　　　　1,699,305
F. MEYER
METHOD OF MAKING GLASS VESSELS
Filed April 14, 1927　　　3 Sheets-Sheet 2

Witnesses.　　　　　　　　　　　　　　　　Inventor.

Jan. 15, 1929.  1,699,305
F. MEYER
METHOD OF MAKING GLASS VESSELS
Filed April 14, 1927  3 Sheets-Sheet 3
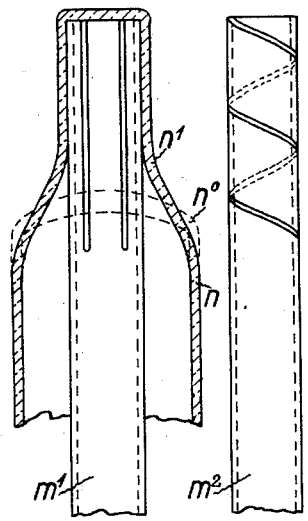
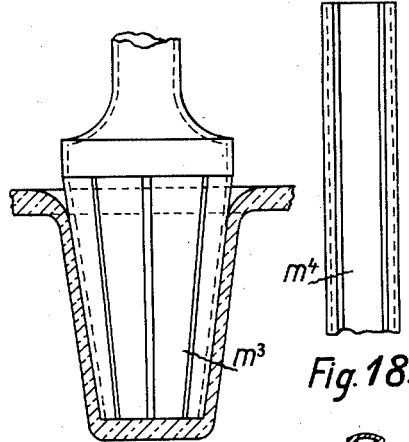
Fig.15  Fig.16.  Fig.17.  Fig.18.  Fig.19.
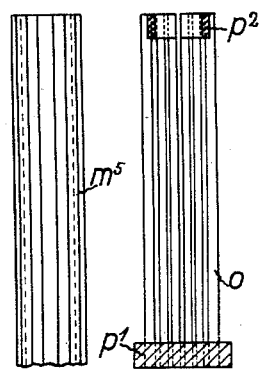
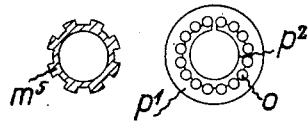
Fig.20.  Fig.22.
Fig.21.  Fig.23.

Patented Jan. 15, 1929.

1,699,305

UNITED STATES PATENT OFFICE.

FELIX MEYER, OF AACHEN, GERMANY.

METHOD OF MAKING GLASS VESSELS.

Application filed April 14, 1927, Serial No. 183,875, and in Germany April 1, 1926.

I have filed applications in Germany, April 1, 1926; April 19, 1926; June 17, 1926; November 20, 1926; December 24, 1926; Austria, March 21, 1927; Switzerland, March 21, 1927; Czechoslovakia, March 23, 1927; Hungary, March 23, 1927; The Netherlands, March 26, 1927.

The present invention pertains to a novel and improved method for the manufacture of glass vessels or containers, and, in accordance with the principles thereof, one end of a glass tube or similar, hollow, glass body is closed by fusing or drawing off a part of the tube, and, while the closed end of the tubular body is still hot and soft, a tool of proper conformation is introduced through the open end of the tube and is pushed against the plastic closure to deform the hot glass thereof into an appropriately-shaped neck, the tool being then withdrawn, whereupon by fusing and drawing off a part of the remaining open end portion of the tube, or otherwise, a final bottom is formed.

This new method permits the manufacture of closed vessels with internally uniform necks of any desired shape or form.

A solid tool of any appropriate, heat-resisting material may be employed when small necks are desired or when a part of the neck may be narrow, but, when it is necessary that the necks be of comparatively large size, in order to avoid their breaking off, the tool should preferably be of an elastic construction, because if this were not the case, the tool in abstracting the heat of the glass neck and thereby itself expanding might tend to cause a rupture of the neck, which, in giving off its heat to the tool, also tends to contract.

In order that those skilled in this art may have a full and complete understanding of the invention, several ways of satisfactorily practicing the process or method have been illustrated in the accompanying drawings forming a part of this specification.

In these drawings:—

Figs. 1 to 6, inclusive, illustrate the manufacture of glass vessels, according to the present invention, in six different steps or stages;

Figs. 7 to 9, inclusive, depict a modification of the method in three stages;

Figs. 10 to 14, inclusive, show four successive steps in the production of glass vials or containers with constricted necks;

Fig. 15 illustrates the practice of the process with the employment of a longitudinally-slitted tool;

Fig. 16 shows a modified, spirally-slitted form of tool;

Fig. 17 represents the manner in which the method is performed with the employment of a tapered, longitudinally-slitted form of tool;

Figs. 18 and 19 show another style of tool in elevation and cross-section, respectively;

Figs. 20 and 21, in similar manner, portray a different form or style of tool;

Figs. 22 and 23, in like manner, present another modified style of tool.

According to the method or process illustrated in Figs. 1 to 6, inclusive, a glass tube $a$, shown in Fig. 1, is divided in the usual way by fusing by a flame into two pieces or sections $a^1$ and $a^2$ (Fig. 2), each with its bottom or end closure at one end only. Tools $b^1$ and $b^2$, respectively, Fig. 3, are introduced into such heated, glass elements $a^1$, $a^2$ while their bottoms or end closures are still hot or plastic, and, by forcing these tools against such bottoms they are shaped or formed into necks or projections $c^1$ and $c^2$, respectively, Fig. 4. Thereupon, the points or ends of the necks may be opened or broken off and the two bodies reversed so as to bring their open ends into register and into contact, whereupon they may be fused together to form a single container, as shown in Fig. 5, having two necks or tapered extensions at its opposite ends. If it is desired to obtain two, single glass vials or containers from such body, this may be accomplished by dividing the tubular element by fusing by a flame into two glass ampoules or receptacles in the customary manner, each with its bottom as shown in Fig. 6.

A modified method of procedure is presented in Figs. 7 to 9, inclusive, and, in accordance with the same, after having made a single glass container $d$, as illustrated in Fig. 7, or two of them, in conformity with the process shown in Figs. 1 to 4, the open end of the body is flanged outwardly under the influence of a flame, giving a structure like that shown in Fig. 8. Then the article is softened by heat close to its flanged end and it is seized or grasped by a tool at the flange, the latter part being withdrawn so that under the influence of a flame we obtain two parts with bottoms, namely the glass vessel or container $d^1$ and the waste-piece $d^2$.

Figure 10:
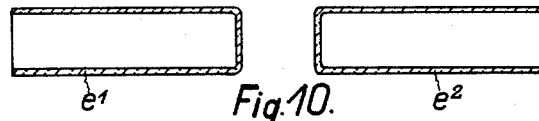
Figure 11:
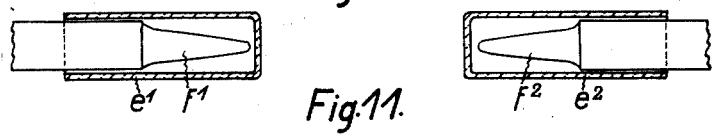
Figure 12:
Figure 13:
Figure 14:
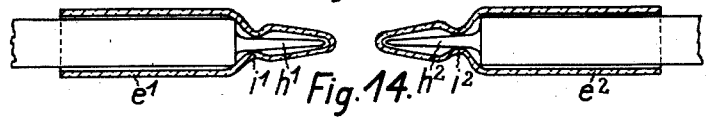

Another plan or course of action is presented step by step in Figs. 10 to 14, inclusive, and, by this, there are first produced, according to the process of Figs. 1 and 2, two tubular bodies $e^1$ and $e^2$, each with its bottom, as portrayed in Fig. 10. Thereupon, tools $f^1$ and $f^2$, respectively, with conical points, Fig. 11, are introduced into these hollow, glass bodies while their bottoms or closures are still plastic and forced against such soft closures, thereby providing necks $g^1$ and $g^2$, respectively, as the tools are advanced properly into position. (See Fig. 12.) The tools $f^1$ and $f^2$ are withdrawn and replaced by tools $h^1$ and $h^2$ with smaller pointed sections. The necks are then constricted at the desired locations, as far as the latter tools will permit, by means of flames so that, as a result, we have constricted necks $i^1$ and $i^2$, respectively, whose internal diameters are equal to the diameters of the pointed sections of the tools employed (see Fig. 14). Further treatment takes place according to the practice disclosed in Figs. 5 and 6 or Figs. 8 and 9 and their correlated descriptions.

Fig. 15 shows a tool $m^1$ for forming a cylindrical neck $n^1$ of a bottle from the plastic end closure $n^0$ of a glass tube $n$. In this case the shaping tool is hollow and is provided with longitudinal slits so as to be elastic in a transverse direction whereby to avoid danger of breaking the formed neck by reason of the expansion of the tool or the contraction of the glass of which the neck is composed.

Fig. 16 illustrates a similar tool $m^2$ which, instead of being provided with longitudinal slits, has a spiral or helical slit giving the implement elasticity in both transverse and longitudinal directions.

A conical, lengthwise-slitted tool $m^3$ is shown in Fig. 17 and it may be employed in much the same way, while Figs. 18 and 19 present a hollow, thin-walled tool $m^4$ having an undulating or wavy cross-section, clearly shown in Fig. 19, such instrument being elastic in a transverse direction, and, while being used, transmitting heat directly only from a part of its outer surface.

Another hollow tool $n^5$ is shown in Figs. 20 and 21 and the external surface of such implement has longitudinal recesses or cavities for the purpose or reducing its heat conducting surface which comes into contact with the glass.

In Figs. 22 and 23 a different style of tool is shown which consists of a plurality of circularly arranged rods $o$ which are inserted from below into a plate $p^1$ while at their upper ends they are supported in grooves of a split ring $p^2$. Hence, this tool acts like a hollow, recessed tool and is, in addition, resilient in a cross direction.

As those acquainted with this art will understand, the invention can be employed in many different ways, the scope of the invention being defined by the appended claims.

I claim:

1. The method of forming a neck on a hollow glass body, consisting in moving axially relatively to one another, a glass tube having a closed heated plastic end and a neck-forming tool introduced into such tube through its opposite open end, whereby said tool engages and deforms said end into a neck and subsequently withdrawing said tool from said tube through such open end thereof.

2. The method of forming a neck on a hollow glass body, consisting in moving axially relatively to one another, a glass tube having a closed heated plastic end and a neck-forming tool introduced into such tube through its opposite open end, whereby said tool engages and deforms said end into a neck, withdrawing said tool from said neck and ultimately from said tube through such open end thereof, and opening the end of said neck.

3. The method of forming a hollow glass body, consisting in moving axially relatively to one another, a glass tube having a closed heated plastic end and a neck-forming tool introduced into such tube through its opposite open end, whereby said tool engages and deforms said end into a neck, withdrawing said tool from said tube through such open end thereof, and closing said open end of said tube by fusion of the glass.

FELIX MEYER.